June 8, 1965  J. T. CASAGRANDE  3,187,434
POSITION PLOTTING DEVICE
Filed March 14, 1960
Fig. 1.
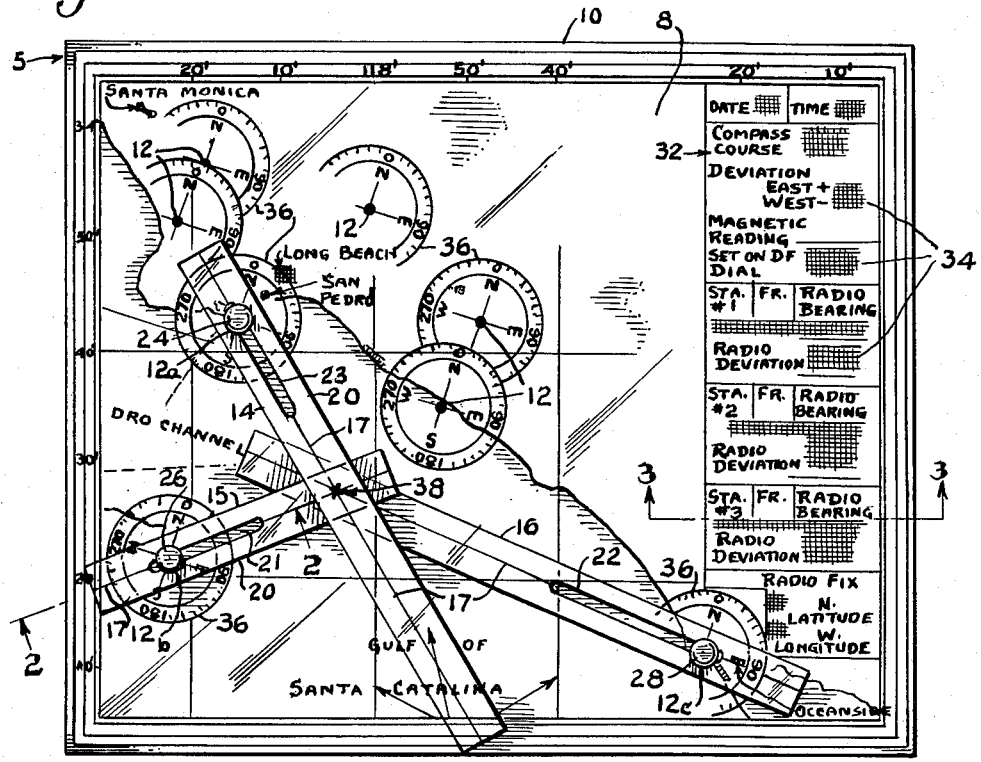
Fig. 4.
Fig. 3.
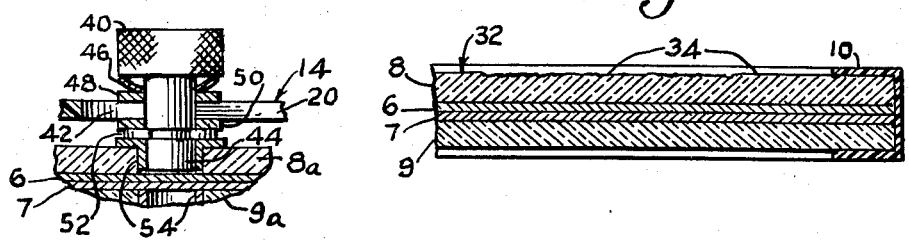
Fig. 2.
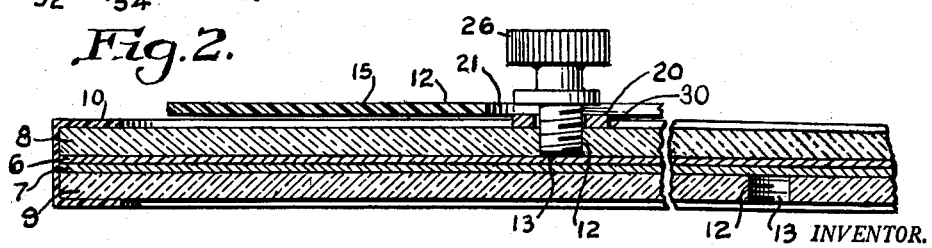
INVENTOR.
JOHN T. CASAGRANDE
BY
Robt. D. Pearson
ATTORNEY.

United States Patent Office 3,187,434
Patented June 8, 1965

3,187,434
POSITION PLOTTING DEVICE
John T. Casagrande, 2606 N. Parish Place,
Burbank, Calif.
Filed Mar. 14, 1960, Ser. No. 14,884
1 Claim. (Cl. 33—1)

This invention relates generally to radio directed navigation devices and more particularly to a radio direction finder especially adapted for use on small pleasure craft and the like.

Radio direction finding for navigation of small craft has hitherto had many disadvantages. First, the coast pilot charts now available plot the specific radio direction finding station system, but few, if any of the commercial broadcasting stations or areo beacons are plotted, although they are a valuable aid in radio direction finding if the locations of said stations are known. To overcome this disadvantage is a basic object of this invention.

Furthermore, the present coast pilot charts are very large and therefore require a large table, which is usually not available on a small craft. The overcoming of this disadvantage is another object of this invention.

A further object of the invention is to eliminate the use of a protractor during the actual plotting and the drawing of pencil lines on the chart, which results in said chart becoming cluttered up with old radio bearing plots.

Still another object of the invention is to provide a double faced, rigid chart means having pivot pin receiving sockets on each side thereof associated with and indicating varying points on the respective maps whereby suitable pointer means may be temporarily pivotally mounted in selective ones of said sockets incident to obtaining a fix on the location of the vessel.

A further disadvantage of radio direction finder navigation on small crafts resides in the paper work involved in correcting the compass heading of the craft and radio deviation affecting the radio bearings. The radio station call letters must be noted and the frequency required to tune the radio direction finder must be known. To overcome the above stated disadvantages while the boat is pitching and rolling is another object of this invention.

Also the present invention has the general object of expediting radio navigation direction finding so as to obtain the radio fix as fast as the radio bearings are read from the direction finder degree scale.

This invention is embodied in a device which is relatively simple, is economical to manufacture, of general serviceability and superiority, and which comprises novel combinations and arrangements of parts, which will appear more fully in the course of the following description. The drawing shows and the specification describes a preferred embodiment of the invention, given by way of example only.

In the drawing, FIG. 1 is a top plan view of a device embodying the invention.

FIG. 2 is a vertical, enlarged scale, sectional view on line 2—2 of FIG. 1.

FIG. 3 is an enlarged scale, vertical section on line 3—3 of FIG. 1.

FIG. 4 is a sectional view of a thumb screw similar to that shown in FIG. 2, but slightly modified.

Reference numeral 5 refers to a pilot model of the device, which comprises charts 6 and 7 arranged back to back as shown in FIGS. 2 and 3 and preferably being 17″ x 14″. These charts are mounted between two pieces of Plexiglas 8 and 9, preferably ⅛″ thick, but any other suitable material may be used. Plastic tape 10 or the like may be used to bind the Plexiglas plates 8 and 9 together to form a compact frame. Holes 12 are drilled through the Plexiglas at the locations of the broadcast antennas, as shown in FIG. 1, said holes being internally threaded as shown at 13 in FIG. 2.

Protractor or station arms 14, 15 and 16, made of celluloid, acetate or similar materials, are cut to the desired lengths. They are then scored down their centers to provide lubber lines 17. Said arms are also slotted at 20, 21 and 22 to provide for length adjustment. Pivot members comprising thumb screws 24, 26 and 28, one shown in FIG. 2, are then inserted through slots 20, 21 and 22 of arms 14, 15 and 16 and spacing washers 30, and are finally threaded into holes 12.

A convenient work form 32, see FIG. 1, is provided on the charts 6 and 7 to facilitate applying the necessary corrections. Certain areas 34 are roughened, see FIGS. 1 and 3, so that the pencil marks can be recorded and later erased, whereby said areas may be used again.

Ninety percent of pleasure boating is conducted within a limited area, usually within a fifty mile radius of the home port. By way of example the charts 6 and 7 (see FIGS. 2 and 3) are halves of a chart covering an area lying between Santa Monica and San Diego, California; the one shown in FIG. 1 covering an area lying between Santa Monica and Oceanside, California.

The commercial broadcast antennae and areo antennae shown in FIG. 1 at holes 12 are plotted and compass roses 36 are drawn with their centers at holes 12, said compass roses being oriented to magnetic north.

The device or pilot model 5 may be held on the lap, used as a chart table, or fastened to the bulkhead with small clips, preferably adjacent the direction finder. The arms 14, 15 and 16 are arranged at the selected station holes 12a, 12b and 12c to be used for the fix. Then the magnetic heading of the craft is set on the desired scale of the direction finder (not shown). The station 12a is then tuned in and nulled. Then the reading on the degree scale of the direction finder is noted. Arm 14 is then rotated to a position wherein its lubber line 17 overlies its compass rose at the above noted bearing and is clamped by the thumb screw 24. The above procedure is repeated for the second and third stations 12b and 12c.

The intersection of the lubber lines of the three arms 14, 15 and 16 will usually form a small triangle. The center of the triangle so formed, 38 in FIG. 1, will indicate the position of the craft.

From the foregoing it is apparent that the device may be used to obtain a radio fix as fast as the stations can be tuned and nulled. The distance from the fix to the destination may be figured from a small scaled ruler (not shown) which can also be used to give magnetic headings.

FIG. 4 shows a modified form of the invention in which the threaded engagement of a thumbscrew with a threaded socket in the chart is dispensed with and in which friction means is provided to prevent unintended longitudinal shifting of the arms relative to the individual pivot means associated therewith. Specifically, the shank 42 of the pivot member 40 corresponding to one of the thumbscrews previously described is provided with a peripheral groove 44 intermediate its ends. The said shank extends through the slot 20 of the arm 14 and carries washers 48 and 50 which, respectively, engage the side of said arm 14 adjacent to the head of the pivot member 40 and the opposite side of said arm and a spring washer 46 is interposed between the head of the pivot member 40 and the washer 48. A retaining ring 52 is snapped into engagement with the groove 44 at the side of the washer 50 remote from the arm 14 and the groove 44 is disposed at such a distance from the under side of the pivot member head that the spring washer 46 is sufficiently compressed to effect frictional gripping of the arm between the washers 48 and 50 of such magnitude as to preclude the possibility of unintentional longitudinal shifting of the arm. The chart is provided with flanged bushings 54 at the centers of the various compass roses in which the end of the pivot member shank 42 disposed beyond the retaining ring 52 is removably received.

It is to be understood that the invention includes all such changes and modifications in the size, shape, materials and arrangements of the several parts as shall come within the purview of the appended claim.

I claim:

In a position plotting means, a rigid base having a flat surface, a chart mounted on said surface showing the geographical features of an area and including a plurality of points from which direction bearings may be obtained substantially simultaneously, each of said points being defined by a pivot pin receiving socket means extending into said base and each of said sockets being surrounded with a separate compass rose oriented to true North with respect to the geographical features on said chart, a lesser plurality of pivot pin elements selectively interchangeably engageable with each of said sockets, a plurality of elongated arm elements carried one each by each of said pivot pin elements, each of said arm elements having a longitudinally extending slot adjacent one end thereof through which the shank portion of the associated pivot pin element extends; said slot permitting pivotal and bodily longitudinal movement of the arm on the pivot pin element, a lubber line on each arm extending from the opposite end thereof to said slot and disposed in alignment with the longitudinal center line of the slot, and means for resisting tendency of the arm to move longitudinally along the pivot pin associated therewith; said last named means constituting spring means interposed between and reacting between each of said arms and the pins associated therewith and effective to create sufficient friction between the arm and the associated pin to secure the arm against unintentional longitudinal displacement relative to the pin.

References Cited by the Examiner

UNITED STATES PATENTS

| | | | |
|---|---|---|---|
| 194,486 | 8/77 | Wadsworth | 33—76 |
| 1,533,097 | 4/25 | Byhre | 33—102 |
| 1,883,628 | 10/32 | Dreifuss | 33—76 |
| 1,965,098 | 7/34 | Eaton | 33—1 |
| 2,114,652 | 4/38 | Dalton | 33—1 |
| 2,235,177 | 3/41 | Stark | 33—1 |
| 2,394,141 | 3/46 | Adorjan et al. | 33—1 X |
| 2,914,853 | 12/59 | Michell | 33—1 |
| 2,930,129 | 3/60 | Richardson | 33—1 |

FOREIGN PATENTS

| | | |
|---|---|---|
| 546,651 | 4/56 | Belgium. |
| 429,651 | 6/35 | Great Britain. |

OTHER REFERENCES

Weems: Air Navigation, Second Ed., 1938, page 223.

ISAAC LISANN, *Primary Examiner.*